United States Patent [19]
Gay

[11] 3,855,888
[45] Dec. 24, 1974

[54] CUTTING EQUIPMENT FOR A MULTI-LINE CONTINUOUS CASTING PLANT

[75] Inventor: Pierre Gay, La Tour En Jarez, France

[73] Assignee: Creusot-Loire Enterprises, Paris, France

[22] Filed: Nov. 26, 1973

[21] Appl. No.: 418,949

[30] Foreign Application Priority Data
Dec. 8, 1972  France..........................72.43720

[52] U.S. Cl....................... 83/303, 83/308, 83/699, 83/316
[51] Int. Cl............................................ B23d 25/06
[58] Field of Search ............ 83/303, 308, 317, 316, 83/699

[56] References Cited
UNITED STATES PATENTS
2,351,868  6/1944  Morgan................................ 83/303
2,836,018  5/1958  Key................................. 83/303 X

*Primary Examiner*—Frank T. Yost
*Attorney, Agent, or Firm*—Cameron, Kerkam, Sutton, Stowell & Stowell

[57] ABSTRACT

Cutting equipment for a multi-line continuous casting plant comprising a plurality of shears each comprising a pair of blades supported by a frame and relatively movable for cutting by rotation of a shaft, wherein the shafts of the shears are aligned and are coupled together to be driven by common driving means, the frames of the shears are angularly movable about the axis of the shafts, and means are provided for the adjustment of the angular position of each frame individually relative to its shaft.

7 Claims, 2 Drawing Figures

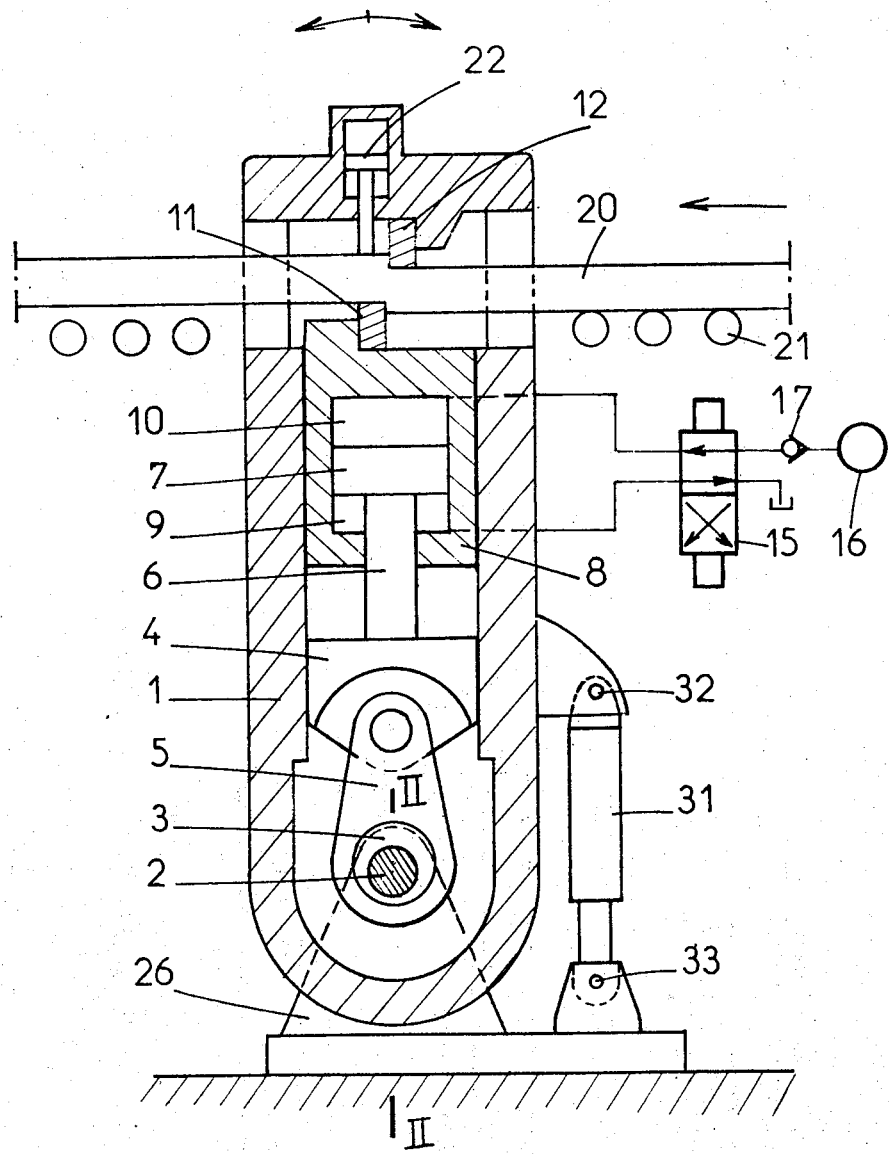
FIG:1

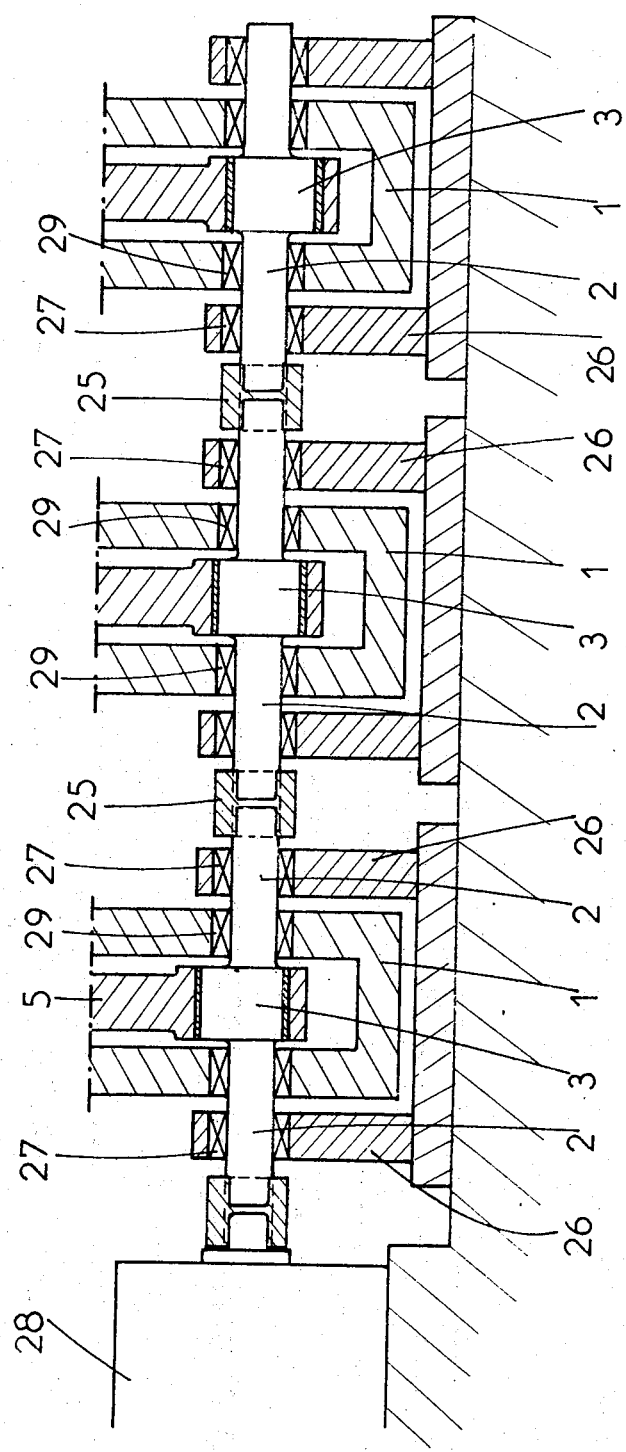
FIG:2

CUTTING EQUIPMENT FOR A MULTI-LINE CONTINUOUS CASTING PLANT

The present invention relates to cutting equipment for a multi-line continuous casting plant, such for example as a continuous billet casting plant.

A continuous billet casting plant is generally multi-line, each production line discharging billets, simultaneously or otherwise, along parallel output paths. Because of the requirements of continuous casting, these output paths are close together, the distances between the lines being of the order of one metre, for example. The billets thus produced must be cut to the required length and this is generally effected by means of shears.

The reduced distance between the lines causes problems in the mounting of the shears. It has been found necessary either to stagger the shears, which has the disadvantage of increasing the area used and the length of the roller tables conveying the billets, or to produce special shears adapted to this particular problem, which prevents the use of known types of shears.

According to the present invention there is provided cutting equipment for a multi-line continuous casting plant comprising a plurality of shears each comprising a pair of blades supported by a frame and relatively movable for cutting by rotation of a shaft, wherein the shafts of the shears are aligned and are coupled together to be driven by common driving means, the frames of the shears are angularly movable about the axis of the shafts, and means are provided for the adjustment of the angular position of each frame individually relative to its shaft.

The invention will now be described in more detail with reference to a particular embodiment thereof, given by way of example only, with reference to the accompanying drawings, in which:

FIG. 1 is a section, in the direction of motion of a billet, through one of the shears of billet cutting equipment, and FIG. 2 is a partial section on the line II—II of FIG. 1 showing the arrangement of three shears.

With reference to the drawings, each shear has a frame 1 traversed by a shaft 2 carrying an eccentric 3. Rotation of the shaft and the eccentric imparts to a slide 4, through a rod 5, a reciprocating motion. A rod 6 is rigidly attached both to slide 4 and to a piston 7 slidable in a cylinder body 8 to form a double-acting ram, having two chambers 9 and 10. Ram cylinder body 8 is rigidly attached to a blade 11; a co-operating blade 12 is rigidly attached to the upper portion of frame 1.

Chambers 9 and 10 of the body 8 are connected to a two-position distributor valve 15, permitting either their supply from a pressurized fluid source 16 or their discharge by communication with a reservoir. A non-return valve 17 is inserted between source 16 and valve 15.

The above described elements are to be found in a progressive action shear of known type. In such a shear, while it is inoperative, valve 15 is in the opposite position to the one shown in FIG. 1, chamber 9 being pressurised and chamber 10 being exhausted. Cylinder body 8 is therefore in its lowermost position and moves with the slide 4. Thus the blade 11 has a reciprocating motion of small amplitude imparted to it by the crankshaft and the opening between blades 11 and 12 is at its maximum. The product 20, supported by rollers 21, moves in the direction of the arrow through the frame of the shear, without contacting the blades.

When it is required to make a cut, valve 15 is placed in the condition shown in FIG. 1 in which chamber 10 is pressurized and chamber 9 is in communication with the reservoir. As a result, body 8 and blade 11 are lifted until the latter contacts product 20. The reciprocating motion imparted to blade 11 by the eccentric will tend, during one reciprocation, to cause the blade to penetrate the product, resulting in a pressure rise in chamber 10 which will close valve 17. The blade 11 then moves upwardly with the slide 4, which causes the blade to be driven into the product by an amount equal to twice the eccentricity of the eccentric. During the return of slide 4, the pressure in chamber 10 decreases and source 16 is able to deliver a fresh quantity of fluid to chamber 10, which prevents the return of the body 8 and blade 11. In the following upward movement of the slide 4, the blade, moving with the slide 4, penetrates the product by a new amount. The small auxiliary ram 22 is designed to press the product, at the beginning of the cut, against the lower blade and to avoid sudden displacement of the product at the end of the cut.

FIG. 2 shows the association, in accordance with the invention, of three progressive action shears, each arranged in a continuous casting line. All the shafts 2 of the shears are coupled and rigidly connected for rotation by linkages 25. The totality of shafts 2 thus forms a single common shaft carried by supports 26 and bearings 27. Common shaft 2 is rotated by motor-reduction unit 28.

The frames 1 of the individual shears thus associated are each pivoted on common shaft 2 by bearings 29. The angular position of each frame, which is thus mounted to oscillate on shaft 2, is defined by the position of a ram 31 shown in FIG. 1 pivoted at 32 on an element of frame 1 and at 33 on a fixed element of the plant. The operation of each shear is as follows. In anticipation of a cut, frame 1 is kept slightly inclined to the product feed side by ram 31. After the cutting order is given, ram 31 is released as soon as blades 11 and 12 have penetrated the product, thus rigidly attaching the shear to the moving product. During the entire duration of the progressive cutting of the product, movement of the latter causes slight pivoting of the shear about shaft 2. At the end of the cut, blade 11 is returned to the inoperative position and ram 31 is operated to return the shear assembly to the waiting position inclined to the product feed side.

The description given above shows the advantage of the above described cutting equipment in accordance with the invention. It is of reduced size enabling the shears for a plurality of lines to be aligned. A single motor-reduction unit can be used to drive several shears. It should be noted in this respect that the drive torque necessary to drive the equipment is not necessarily the sum of the torques necessary for each of the shears. In fact, although on a multi-line continuous casting machine it may be necessary to consider making several cuts simultaneously, it may be sufficient to angularly stagger the eccentrics so that the momentary effort to be supplied is less than the sum of the individual cutting efforts on each shear. In the particular case shown in FIG. 2 in which three shears have been associated, by angularly staggering the eccentrics by 120°, the total cutting effort scarcely differs from the cutting effort necessary for a single billet, taking into account the characteristic of the cutting effort as a function of the driving of the blade into the product. Thus not only can the number of motors be decreased but also the installed power of these motors can be decreased. Finally, where there is a risk of having a colder and therefore harder product than foreseen, there is an advantage in using hydraulic means to drive the blades, because safety valves can be used which efficiently protect the shears against the risks of overloading.

Of course, the invention is not intended to be limited to the single embodiment which has been described by way of example, but also covers other embodiments which differ from it in detail and modifications. For example the invention is not only applicable to the progressive type of shear which has been described, but is also applicable in the case where the superimposition of the reciprocating motion of the blade on a progressive advance motion is effected not by hydraulic means but by mechanical means such as racks and ratchets.

Similarly, the invention is also applicable in the same manner to a progressive shear in which, for example, blade 11 is directly linked to the connecting rod bearing and subjected to a single reciprocating motion, the progressive bringing together motion of the blades being applied to the co-operating blade 12.

Finally, it will be clear that the reciprocating motion of the blade could be imparted, instead of by a system including an eccentric, by a normal elbowed crankshaft, and that the means for inclining the shear frame could be controlled by any other means equivalent to ram 31.

What is claimed is:

1. Cutting equipment for a multi-line continuous casting plant comprising:
   1. a plurality of shears each comprising:
      a. a frame,
      b. cutting blade means,
      c. means for mounting said cutting blade means in said frame,
      d. a shaft,
      e. means for coupling said shaft to said cutting blade means for causing said blade means to perform a cutting motion on rotation of said shaft,
      f. means for mounting said frame on said shaft for angular movement relative thereto, and
      g. means for adjusting the angular position of said frame relative to said shaft;
   2. means for coupling said shafts of said shears for co-rotation, said shafts being aligned, and
   3. drive means common to said shafts for driving said shafts.

2. Cutting equipment according to claim 1 wherein each said adjustment means comprises a ram extending between a respective said frame and a relatively fixed point.

3. Cutting equipment according to claim 1 wherein each said blade means comprises a pair of blades, one of said blades being coupled to said shaft by eccentric means for reciprocation thereby.

4. Cutting equipment according to claim 3 wherein said eccentric means are angularly staggered relative to each other.

5. Cutting equipment according to claim 1 wherein each said blade means comprises a pair of blades, one of said blades being coupled to said shaft by a crank for reciprocation thereby.

6. Cutting equipment according to claim 5 wherein said cranks are angularly staggered relative to each other.

7. Cutting equipment according to claim 1 wherein said shears are of the progressive type.

* * * * *